United States Patent [19]

Abbey et al.

[11] Patent Number: 5,641,834

[45] Date of Patent: Jun. 24, 1997

[54] MODIFIED POLYALKADIENE-CONTAINING COMPOSITIONS

[75] Inventors: Kirk Joseph Abbey, Raleigh; Ian Christopher Quarmby, Apex, both of N.C.

[73] Assignee: Lord Corporation, Cary, N.C.

[21] Appl. No.: 570,422

[22] Filed: Dec. 11, 1995

[51] Int. Cl.$^6$ .............................. C08L 51/00; C08L 39/04; C08L 77/00; C08L 31/02; C08L 33/06; C08L 71/02

[52] U.S. Cl. .............................. 525/77; 525/80; 525/73; 525/181; 525/183; 525/184; 525/187; 525/72

[58] Field of Search .............................. 525/296, 303, 525/77, 80, 72, 73, 181, 183, 184, 187

[56] References Cited

U.S. PATENT DOCUMENTS

| | | | |
|---|---|---|---|
| 3,897,514 | 7/1975 | Allabashi | 260/836 |
| 3,910,992 | 10/1975 | Skillicorn | 260/485 G |
| 3,925,330 | 12/1975 | McCarthy | 260/78.5 B |
| 4,156,700 | 5/1979 | Tremblay et al. | 260/837 R |
| 4,322,509 | 3/1982 | Zalucha | 525/287 |
| 4,467,071 | 8/1984 | Dawdy | 525/112 |
| 4,532,299 | 7/1985 | Seneker | 525/122 |
| 4,769,419 | 9/1988 | Dawdy | 525/111 |
| 4,857,434 | 8/1989 | Klinger | 430/286 |
| 5,492,976 | 2/1996 | Shalati et al. | 525/285 |
| 5,587,433 | 12/1996 | Boeckeler | 525/333.2 |

FOREIGN PATENT DOCUMENTS

| | | |
|---|---|---|
| 4-154823 | 3/1978 | Japan . |
| 53-22589 | 5/1992 | Japan . |
| 92-055453 | 9/1992 | Japan . |
| 94-017451 | 3/1994 | Japan . |

OTHER PUBLICATIONS

Nihon Gomu Kyokaishi (Japanese Rubber Asso.), "*Crosslinking of Acid Anhydride Adducted Liquid Polybutadiene with Glycidyl Methacrylate*", vol. 51, No. 3 (1978), 187–192.

*Primary Examiner*—Joseph L. Schofer
*Assistant Examiner*—Wu C. Cheng
*Attorney, Agent, or Firm*—Wayne W. Rupert

[57] ABSTRACT

A composition that includes an olefinic-terminated polyalkadiene that includes carboxy ester linking groups and at least one nascent secondary hydroxyl group that is capped with a monoisocyanate. The composition also includes a free radical-polymerizable monomer such as an olefinic monomer and, optionally, a second polymeric material. In a preferred embodiment the composition is an adhesive that also includes a phosphorus-containing compound and an ambient temperature-active redox catalyst system.

22 Claims, No Drawings

MODIFIED POLYALKADIENE-CONTAINING COMPOSITIONS

BACKGROUND OF THE INVENTION

This application is related to commonly-assigned, concurrently filed, U.S. patent application Ser. No. 08/570,055.

The invention relates to polymer-containing compositions, particularly structural adhesive compositions. S. R. Hartshorn in *Structural Adhesives, Chemistry and Technology*, Plenum, 1986 (ISBN 0-306-42121-6) lists three definitions for "structural adhesive" on page 2—(I) "thermosetting resin compositions used to form permenant, load-bearing, joints between two rigid, high-strength, adherends;" (2) "a bonding agent used for transferring required loads between adherends exposed to service environments typical for the structure involved;" and (3) "greater than 1,000 psi tensile shear strength measured by the ASTM D-1002 procedure." As used herein, "structural adhesive" can be any adhesive that meets at least one of these definitions.

One application area for structural adhesives is in the bonding of lightweight metal and plastic materials in the fabrication, repair and reconstruction of automotive and truck vehicle bodies and component parts. The use of elastomers in structural adhesives to improve low temperature properties, such as impact resistance, is well known. While both solid gum and liquid elastomers can be utilized for this purpose, the limited solubility and greater incompatibility of the solid elastomers can restrict their use, especially at higher levels of elastomer concentrations.

U.S. Pat. No. 4,769,419 describes an acrylic adhesive composition that includes a urethane-modified olefinic-terminated liquid elastomer. The precursor for producing the novel elastomer is derived by reacting olefinic monoepoxide compounds (e.g., glycidyl methacrylate) with polycarboxylic homopolymers or copolymers of conjugated dienes having from 4 to 12 carbon atoms (e.g., carboxylated polybutadiene). According to Examples 1–3, 1,8-diazabicyclo[5.4.0]undec-7-ene is used as a catalyst for reacting carboxyl-terminated polybutadiene liquid rubber and glycidyl methacrylate. The precursor compound is reacted with a monoisocyanate (phenyl isocyanate) to produce the novel elastomer. An acrylic structural adhesive composition is described that includes the novel elastomer.

Although the liquid elastomers described in U.S. Pat. No. 4,769,419 have proven to be very useful, they do have a few drawbacks. They exhibit a sufficiently high viscosity such that a diluent is required during their commercial production. The presence of a diluent increases the complexity and cost of producing and using the liquid elastomer and contributes to the odor of the adhesive that includes the liquid elastomer. A less expensive liquid elastomer that has a lower viscosity so that a diluent is not required at least during commercial production would be very desirable.

Polybutadiene elastomers have been modified to include various terminal or pendant groups for various purposes. One class of modified polybutadienes is liquid vinyl- or olefinic-terminated polybutadienes. For example, U.S. Pat. Nos. 3,910,992 and 3,925,330 describe reacting a carboxyl-terminated polybutadiene with glycidyl acrylate to obtain a liquid vinylidene-terminated polymer of the structure:

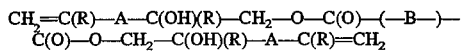

wherein A is preferably a bivalent radical of the structure —CH$_2$—O—C(O)— and B is a polybutadiene backbone. A tertiary amine is the preferred catalyst.

U.S. Pat. No. 3,897,514 discloses a process for curing hydroxy-terminated prepolymer to rubber that includes mixing a hydroxy-terminated polybutadiene prepolymer with a curing system comprising a cyclic anhydride and a di- or tri-functional epoxide. The curing catalyst is a chromium salt. The epoxides are diglycidyl ether epoxides, cyclic aliphatic diepoxides and triepoxides. The resulting product is cured and is a solid.

U.S. Pat. No. 4,156,700 discloses a propellant additive that is a prepolymer derived from reacting hydroxyl-terminated polybutadiene and an anhydride. According to Example 1, a mixture of 1420 g (1.00 eq) hydroxyl-terminated polybutadiene (R45M from Arco Chemical), 100 g (1.0 mole) succinic anhydride and benzene are heated under reflux conditions for 48 hours. After evaporation of the solvent the viscosity of the resulting product is reported to be 180 poises at 25° C. According to Example III, a mixture of 154 g (1 eq.) cis-1,2-cyclohexanedicarboxylic anhydride and 1420 g (1 eq.) R45M polybutadiene is heated at 90° C. for 66 hours. The resulting product is reported to have a viscosity of 374 poises at 25° C.

U.S. Pat. No. 4,857,434 discloses a liquid methacrylate terminated polymeric hydrocarbon maleate prepolymer having pendant maleate groups. This prepolymer is obtained by a multi-step synthesis that includes two separate maleation reactions (i.e., there are two steps of reacting an intermediate with maleic anhydride).

The first step involves the reaction of a functionalized liquid hydrocarbon polymer having hydroxyl, thiol or amine terminal groups "with an unsaturated carboxylic acid anhydride" to provide a maleate. The structure given in column 4 for the unsaturated carboxylic acid anhydride reactant includes a C=C bond in the heterocyclic ring. The reaction of 2 moles of maleic anhydride with each mole of hydroxyl terminated polybutadiene is presented as an example. The reaction product structure shown in column 3 includes a C=C bond outside the polybutadiene core backbone. The reaction "is preferably carried out in the presence of a thermal inhibitor such as di-t-butyl cresol" and, "although no catalysts are necessary", phosphoric acid and stannous octoate are mentioned. "The reactants are usually added in approximately stoichiometric amounts so that each functional group, e.g., a hydroxyl on the polymer, can react with one maleic anhydride molecule".

The second step involves reacting the maleate with a reagent containing a methacrylate group. Glycidyl methacrylate is mentioned as a methacrylate-containing reagent. A catalyst is not necessary, but triethylamine is mentioned as one catalyst useful for reducing reaction time and temperature.

The third step involves reacting maleic anhydride with the hydroxyl groups generated by the previous reaction with glycidyl methacrylate to provide pendant maleate groups.

The prepolymer by itself or with mono- or multi-functional unsaturated monomers (such as a reactive acrylic or methacrylic diluent) and with either a thermal or photo-initiator on exposure to heat, UV or high energy ionizing radiation forms a cured material that is said to be useful as an adhesive.

JP-B-94017451, according to an English translation, discloses a flexible resin composition that is made by mixing an epoxy resin and the product of an "alkenyl anhydrous succinic acid" reacted with a hydroxy-terminated polybutadiene. The epoxy resin component typically is a diepoxide such as bisphenol A diglycidyl ether, although the possibility of a liquid mono-epoxy resin also is mentioned. The resin composition is said to be useful for insulation.

JP-B-92055453; according to an English translation, discloses a rubber composition that includes a solid rubber and the product of a liquid diene copolymer having a terminal hydroxyl group reacted with an "alkenyl anhydrous succinic acid". The diene/alkenyl anhydrous succinic acid reaction can be carried out at 10°–200° C., 1–10 atms and 0.5–24 hours. The "alkenyl anhydrous succinic acid" is provided in an amount greater than necessary to react all of the hydroxy groups.

SUMMARY OF THE INVENTION

According to this invention there is provided a composition that includes a liquid elastomer that is less expensive to produce relative to the liquid elastomers described in U.S. Pat. No. 4,769,419. The liquid elastomer has a lower viscosity and, consequently, does not require a diluent during its production.

The composition includes:

(i) at least one free radical-polymerizable monomer;

(ii) at least one first polymer selected from the group consisting of (a) a polymer A having a structure represented by

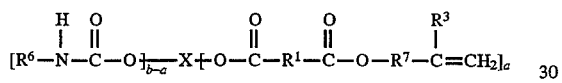

wherein

X is a polyalkadiene residue, a averages from 1.2 to 2.6, preferably 1.6 to 2.4, per polymer molecule, provided a is ≦b, b is at least 1.2, preferably 1.2 to 3, more preferably 1.6–2.4, per polymer molecule, $R^1$ is a divalent radical that includes at least two carbon atoms and is selected from the group consisting of saturated alkylene, substituted saturated alkylene, arylene, and saturated heterocyclic, $R^6$ is phenyl, napthyl, an alkyl group having from 1 to 24 carbon atoms, substituted phenyl, substituted napthyl, phenylalkyl or napthylalkyl, $R^7$ has the structure

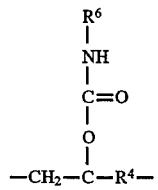

wherein $R^4$ is a divalent radical selected from the group consisting of alkylene, alkylene ester, arylene and alkylene ether, and $R^3$ is hydrogen, an alkyl group of 1 to 4 carbon atoms, —CH=CH$_2$, or —R$^5$—CH=CH$_2$ wherein $R^5$ is an alkylene radical having 1 to 4 carbon atoms; and (b) a polymer B having a structure represented by the formula

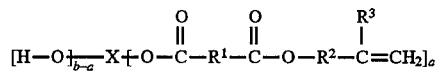

wherein

X is a polyalkadiene residue, a averages 1.2 to 2.6, preferably 1.6 to 2.4, per polymer molecule, provided a is ≦b, b is at least 1.2, preferably 1.2 to 3, more preferably 1.6–2.4, per polymer molecule, $R^1$ is a divalent radical that includes at least two carbon atoms and is selected from the group consisting of saturated alkylene, substituted saturated alkylene, arylene, and saturated heterocyclic, $R^2$ has the structure

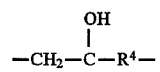

wherein $R^4$ is a divalent radical selected from the group consisting of alkylene, alkylene ester, arylene and alkylene ether, and $R^3$ is hydrogen, an alkyl group of 1 to 4 carbon atoms, —CH=CH$_2$, or —R$^5$—CH=CH$_2$ wherein $R^5$ is an alkylene radical having 1 to 4 carbon atoms; and (iii) optionally, at least one second polymeric material selected from the group consisting of poly(acrylic) ester, poly(methacrylic) ester, poly(urethane), poly (amide), polyester, poly(oxazoline), poly(styrenic), and poly(carbonate).

According to a preferred embodiment the composition is an adhesive composition that further includes a co-reactive phosphorus-containing compound and an ambient temperature-active redox catalyst system.

DETAILED DESCRIPTION OF THE PREFERRED EMBODIMENTS

In general, the materials represented by the formulae A and B can be made by reacting a hydroxyl-terminated polyalkadiene with a saturated cyclic acid anhydride to produce a carboxylic acid-terminated polyalkadiene intermediate that includes a carboxy ester linkage between a polyalkadiene core and the carboxylic acid terminal group. The carboxylic acid-terminated polyalkadiene intermediate is reacted with at least one olefinic monoepoxide, particularly a methacrylate or acrylate compound (such class of compounds being referred to herein as a (meth)acrylate compound) that contains an epoxy terminal group to produce a (meth)acrylate-terminated polyalkadiene that includes at least 1.2 nascent secondary hydroxyl groups that may be represented in formula B. The methacrylate-terminated polyalkadiene then is reacted with one or more monoisocyanates to cap the nascent secondary hydroxyl groups and the residual hydroxyl groups remaining on the polyalkadiene core to produce an elastomeric polymer that may be represented in formula A. This process is described below in more detail.

A polyalkadiene residue X is the core segment of the polymer backbone of the modified polyalkadiene of the invention. The polyalkadiene residue X is the structure that results when a polyalkadiene is reacted according to the method of the invention. As employed herein the term "polyalkadiene" refers to polymers derived from at least one conjugated diene such as 1,3-butadiene, 2-methyl-1,3-butadiene, 2-chloro-1,3-butadiene, and the like, and includes not only homopolymers of such dienes but also copolymers or terpolymers of such dienes and one or more other monomers copolymerized therewith, such other monomers preferably being selected from the group consisting of acrylonitrile, methacrylonitrile, styrene and olefinic monocarboxylic acids and their esters. Such polyalkadienes are well-known and are described, for example, in U.S. Pat. No. 4,769,419. The preferred polyalkadiene precursors are polybutadiene, poly(butadiene-acrylonitrile) and poly(butadiene-methacrylonitrile-acrylic acid), with polybutadiene, particularly 1,4-polybutadiene, being especially preferred. The relative amount of the different repeating units derived from the dienes and the other monomers, if present, may vary. In general, the polyalkadiene residue X can include 5–98 weight percent 1,4-polybutadiene, 0 to 95 weight percent 1,2-polybutadiene, 0 to 40 weight percent acrylonitrile, 0 to 40 weight percent styrene, and 0 to 5 weight percent acrylic or methacrylic acid or ester, based on the weight of the polyalkadiene residue X. Another possible precursor is a partially- or fully-hydrogenated polyalkadiene, preferably partially- or fully-hydrogenated polybutadiene. "Partially-hydrogenated polyalkadiene" as used herein means that from between 1 and 99 percent of the olefinic unsaturated bonds in the polyalkadiene are reduced to the saturated alkane structure. "Fully-hydrogenated polyalkadiene" as used herein means that substantially 100 percent of the olefinic unsaturated bonds in the polyalkadiene are reduced to the saturated alkane structure. When higher levels of hydrogenation are used, a greater degree of 1,2-vinyl polymerization of the diene monomer is required to prevent crystallinity. The polyalkadiene precursor preferably is a liquid at 20° C.

$R^1$ is a divalent saturated alkylene, divalent substituted saturated alkylene, divalent aromatic radical or divalent saturated heterocyclic radical that is derived, along with the carboxy ester radical attached to the polyalkadiene residue X, from the reaction of the hydroxyl terminal groups of the polyalkadiene precursor and a saturated cyclic acid anhydride. As used herein "saturated cyclic acid anhydride" means an acid anhydride that does not include any non-aromatic unsaturation in the ring structure that includes the acid anhydride functionality. The particular structure of $R^1$ will depend upon the specific saturated cyclic acid anhydride. $R^1$ may be a straight-chained saturated alkylene radical having 2 to 4 carbon atoms. For example, $R^1$ may be —CH$_2$—CH$_2$— (succinic anhydride is the saturated cyclic acid anhydride) or —CH$_2$—CH$_2$—CH$_2$— (glutaric anhydride is the saturated cyclic acid anhydride). $R^1$ may also be a substituted saturated alkylene radical having 2 to 4 carbon atoms in the alkylene portion and including at least one alkyl, alkenyl, aryl or alkylaryl substituent bonded to at least one of the carbon atoms of the alkylene portion. For example, the saturated cyclic acid anhydride may be an alkyl, alkenyl, aryl or alkylaryl succinic anhydride or an alkyl, alkenyl, aryl or alkylaryl glutaric anhydride wherein the alkyl, alkenyl, aryl or alkylaryl groups preferably have 1 to 18, more preferably 8 to 12, carbon atoms. For example, if dodecenylsuccinic anhydride (available for example from Dixie Chemical Company) is employed, $R^1$ will have the structure

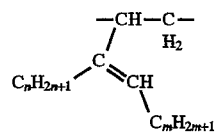

wherein n+m=10. $R^1$ also may be a divalent unsubstituted or substituted arylene wherein the divalent bond sites are located on the aromatic ring. Alkyl, halo, alkoxy and alkenyl groups are among the possible substituent groups on the aromatic ring. For example, the saturated cyclic acid anhydride may be phthalic anhydride and thus $R^1$ will have the structure

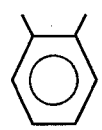

$R^1$ may also be a saturated heterocyclic radical having at least 2 carbon atoms. For example, the saturated cyclic acid anhydride may be diglycolic anhydride and thus $R^1$ will have the structure

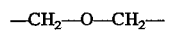

$R^2$ is derived, along with the carboxy ester radical linking $R^1$ and $R^2$, from the reaction of a terminal carboxyl group of the carboxylic acid-terminated polyalkadiene intermediate product and an epoxy group of an olefinic monoepoxide compound, preferably a compound that contains both an epoxide and a vinylidene group. $R^4$ may be a divalent alkylene, divalent alkylene ester, divalent arylene or divalent alkylene ether. $R^4$ preferably is an alkylene ester, particularly —CH$_2$—O—C(O)—.

The vinylidene or olefinic terminal group of polymer B is derived from the vinylidene or olefinic group of the olefinic monoepoxide. Consequently, $R^3$ depends upon the structure of the group attached to the β-carbon of the vinylidene or olefinic group of the olefinic monoepoxide. $R^3$ preferably is hydrogen or an alkyl such as methyl.

$R^7$ is derived from the capping of the hydroxyl group of $R^2$ with a monoisocyanate compound. $R^6$ preferably is phenyl or a phenylalkyl such as m-isopropenyl-α,α-dimethyl benzyl.

Polymer A and polymer B can have a number average molecular weight of about 1,500 to 10,000, preferably about 1,500 to 6,000.

Polymer A and/or polymer B can be included in a variety of free radical curable compositions. These compositions include at least one monomer that is free radical-polymerizable such as, for example, an olefinically unsaturated monomer selected from the group consisting of acrylate esters, methacrylate esters, maleate esters, fumerate esters, styrenics, vinyl esters and similar monomers. The compositions also can include as an optional component a second polymeric material such as poly(acrylic) or poly(methacrylic) esters, poly(urethanes), poly(amides), polyesters, poly(oxazolines), poly(styrenics), poly(carbonates), and the like. The second polymeric material can optionally include an ethylenically unsaturated structure that is copolymerizable with the free radical-polymerizable monomers, One preferred type of composition is an adhesive that includes at least one olefinically-unsaturated reactive monomer, polymer A and/or B, and curing agents, with cure being effected through a free radical or ionic polymerization mechanism. The adhesives preferably contain at least one second polymeric material in addition to polymer A. The additional polymeric material may or may not be reactive, that is, capable of being polymerized per se or at least capable of interpolymerizing with the reactive monomer(s), such as grafting onto or crosslinking the growing polymers from the reactive monomer polymerization. Another possibility are surface-activated structural adhesives such as those described in U.S. Pat. Nos. 5,096,962, 4,857,131, 4,855,001 and 4,703,089. These surface-activated structural adhesives typically include an olefinically unsaturated monomer, a polymeric material in addition to polymer A, a sulfonyl-containing compound, a transition metal and an acidic compound. Surface-activated structural adhesives cure at ambient temperatures when brought into contact with certain metal surfaces, regardless of whether air or oxygen is excluded Polymer A and/or B also could be included in the matrix composition of a fiber-reinforced composite wherein the olefinic terminal group of polymer A and/or B reacts or bonds with the matrix composition. Such matrix compositions could be any composition that includes an unsaturated polyester, styrenic monomers, and initiator components.

Polymer A and/or B is useful to improve low temperature properties of the adhesive such as shear, impact and peel strength.

A particularly preferred adhesive composition is an ambient temperature-curable structural adhesive composition that includes (a) 10–90, preferably 20–50, weight percent of an olefinic monomer selected from the group consisting of acrylic acid, substituted acrylic acid, ester of acrylic acid, ester of substituted acrylic acid, styrene, substituted styrene, butadiene, vinylidene chloride and vinyl acetate;

(b) 10–80, preferably 20–50, weight percent of the polymer A and/or B represented by the formulae above;

(c) 0–40, preferably 1–25, weight percent of an olefinic urethane reaction product of an isocyanate-functional prepolymer and a hydroxy-functional monomer having at least one unit of polymerizable unsaturation, such reaction product being characterized by the presence of at least two units of unsaturation and the substantial absence of free isocyanate products;

(d) 0–20, preferably 2–10, weight percent of a phosphorus-containing compound having one or more olefinic groups and no less than one P—OH group; and (e) an ambient temperature-active catalyst system that includes at least one reducing agent and at least one oxidizing agent that are co-reactive at ambient temperature to generate free radicals that are capable of initiating and propagating the cure of said adhesive composition, wherein the weight percents are based on the total weight of components (a)–(e).

The free radical-polymerizable adhesive compositions of the invention are normally provided as two package systems, with the packages being mixed or contacted at the time of use to provide a free radical curable adhesive. These two package systems include (I) a first package comprising (a) 10–90, preferably 20–50, weight percent of an olefinic monomer selected from the group consisting of acrylic acid, substituted acrylic acid, ester of acrylic acid, ester of substituted acrylic acid, styrene, substituted styrene, butadiene, vinylidene chloride and vinyl acetate;

(b) 10–80, preferably 20–50, weight percent of the polymer A and/or B represented by the formula above;

(c) 0–40, preferably 1–25, weight percent of an olefinic urethane reaction product of an isocyanate-functional prepolymer and a hydroxy-functional monomer having at least one unit of polymerizable unsaturation, such reaction product being characterized by the presence of at least two units of unsaturation and the substantial absence of free isocyanate products;

(d) 0–20, preferably 2–10, weight percent of a phosphorus-containing compound having one or more olefinic groups and no less than one P—OH group (e) 0.05–10, preferably 0.1–6, weight percent of at least one reducing agent which is interactive with an oxidizing agent to produce free radicals which are capable of initiating and propagating free radical polymerization reactions; and (II) a second package comprising a bonding activator containing an oxidizing agent of a room temperature-active redox couple catalyst system, the oxidizing agent being reactive at room temperature with agent (e) when the first and second packages are mixed to produce free radicals which are capable of initiating and propagating free radical polymerization, the amount of the oxidizing agent being sufficient to interact with agent (e), wherein the weight percents are based on the total amount of the first package.

Free radical-polymerizable monomers that are useful in the invention can be olefinic monomers that are characterized by the presence of a —C═C— group. Representative olefinic monomers include esters of (meth)acrylic acid such as methyl methacrylate, ethyl methacrylate, butyl methacrylate, methyl acrylate, butyl acrylate, cyclohexyl acrylate, hexyl acrylate, 2-ethylhexyl acrylate, lauryl acrylate, ethyl acrylate, diethylene glycol dimethacrylate, dicyclopentadienyloxyethyl methacrylate, cyclohexyl methacrylate, lauryl methacrylate, glycidyl methacrylate and tetrahydrofurfuryl methacrylate; methacrylic acid; acrylic acid; substituted (meth)acrylic acids such as itaconic acid, acrylonitrile, methacrylonitrile, acrylamide and methacrylamide; styrene; substituted styrenes such as vinyl styrene, chlorostyrene, methyl styrene and n-butyl styrene; vinyl acetate; vinylidene chloride; and butadienes such as 2,3-dichloro-1,3-butadiene and 2-chloro-1,3-butadiene.

The isocyanate-functional prepolymers which are suitable for producing the olefinic urethane reaction product are well-known. Typically, such prepolymers are adducts or condensation products of polyisocyanate compounds having at least two free isocyanate groups and monomeric or polymeric polyols having at least two hydroxy groups, including mixtures of such polyols. The reaction between the polyisocyanate and the polyols is effected employing an excess amount of polyisocyanate to ensure that the isocyanate-functional prepolymer will contain at least two free, unreacted isocyanate groups.

Polyols useful in preparing the isocyanate-functional prepolymer preferably have an number average molecular weight of from about 50 to about 3,000. Suitable polyols include polyalkylene gylcols such as polyethylene glycols; polyetherpolyols such as those prepared by additional polymerization of ethylene oxide and a polyol such as trimethylol propane in a ratio to provide unreacted hydroxyl groups in the product; organic hydroxylated elastomers exhibiting second order glass transition temperatures below about 5° C. such as poly(butadiene-styrene)polyols and poly(butadiene) polyols; polyester polyols such as are prepared by polymerizing polyols such as diethylene glycol, trimethylol propane or 1,4-butanediol with polycarboxylic acids such as phthalic, terephthalic, adipic, maleic or succinic acids, in a ratio to provide unreacted hydroxyl groups in the product; glyceride esters of hydroxylated fatty acids such as castor oil, glycerol monoricinoleate, blown linseed oil and blown soya oil; and polyesterpolyols such as are prepared by the polymerization of a lactone such as epsilon caprolactone.

Polyisocyanates which can be reacted with polyols to form isocyanate-functional prepolymers can be any isocyanate compound having at least two free isocyanate groups, including aliphatic, cycloaliphatic and aromatic compounds. Representative isocyanates include, without limitation, 2,4-toluene diisocyanate, 2,6-toluene diisocyanate, 4,4'-isocyanate), diisocyanate, m- and p-phenylene diisocyanate, polymethylene poly(phenyl isocyanate), hexamethylene diisocyanate, 4,4'-methlenebis(cyclohexyl isocyanate), isophrone diisocyanate, and other aliphatic, heterocyclic and aromatic polyisocyanates, and including mixtures of such polyisocyanates. Currently, cycloaliphatic and aromatic polyisocyanates are preferred.

Hydroxyl-functional monomers that can be reacted with the isocyanate-functional prepolymer to provide unsaturation in the olefinic urethane reaction product include, without limitation, hydroxyethyl acrylate, hydroxyethyl methacrylate, alkyl alcohol and vinyl alcohol.

Phosphorus-containing compounds that enhance metal adhesion can be any derivative of phosphinic acid, phosphonic acid or phosphoric acid having at least one P—OH group and at least one organic moiety characterized by the presence of an olefinic group, which is preferably terminally located. A listing of such phosphorus compounds is found in U.S. Pat. No. 4,223,115.

A preferred phosphorus-containing compound has a structure that may be represented by the formula

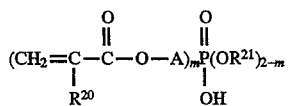

wherein $R^{20}$ is selected from the group consisting of hydrogen, an alkyl group having from one to 8, preferably one to 4, carbon atoms, and $CH^2=CH-$; $R^{21}$ is selected from the group consisting of hydrogen, an alkyl group having from one to 8, preferably one to 4 carbon atoms; A is selected from the group consisting of $-R^{22}O-$ and $(R^{23}O)_n$, wherein $R^{22}$ is an aliphatic or cycloaliphatic alkylene group containing from one to 9, preferably 2 to 6, carbon atoms; $R^{23}$ is an alkylene group having from one to 7, preferably 2 to 4, carbon atoms; n is an integer from 2 to 10, and m is one or 2, preferably one.

Phosphorous-containing compounds having vinyl unsaturation are preferred over such compounds having allylic unsaturation, with monoesters of phosphinic, phosphonic and phosphoric acids having one unit of vinyl or allylic, especially vinyl, unsaturation presently being preferred. Representative phosphorus-containing compounds include, without limitation, phosphoric acid; 2-methacryloyloxyethyl phosphate; bis-(2-methacryloxyloxyethyl) phosphate; 2-acryloyloxyethyl phosphate; bis-(2-acryloyloxyethyl) phosphate; methyl-(2-methacryloyloxyethyl) phosphate; ethyl methacryloyloxyethyl phosphate; methyl acryloyloxyethyl phosphate; ethyl acryloyloxyethyl phosphate; compounds of the above formula wherein $R^8$ is hydrogen or methyl and $R^9$ is propyl, isobutyl, ethylhexyl, halopropyl, haloisobutyl or haloethylhexyl; vinyl phosphonic acid; cyclohexene-3-phosphonic acid; alphahydroxybutene-2 phosphonic acid; 1-hydroxy-1-phenylmethane-1,1-diphosphonic acid; 1-hydroxy-1-methyl-1-disphosphonic acid: 1-amino-1 phenyl-1,1-diphosphonic acid; 3-amino-1-hydroxypropane-1,1-disphosphonic acid; amino-tris (methylenephosphonic acid); gamma-aminopropylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyl) phosphinic acid and allyl methacryloyloxyethyl phosphinic acid.

The preferred adhesive composition can optionally include 0 to 40, preferably 0 to 20 weight percent, based on the total weight of the adhesive composition, of an epoxy component that can be any monomeric or polymeric compound or mixture of compounds having an average of greater than one 1,2-epoxy groups per molecule. The polymeric epoxide materials can have a number-average molecular weight of 300 to 10,000. Useful epoxy compounds are well-known and include the polyglycidyl ethers of polyhydric alcohols such as ethylene glycol, triethylene glycol, 1,2-propylene glycol, 1,5-pentanediol, 1,2,6-hexanetriol, glycerol and 2,2-bis(4-hydroxy-cyclohexyl) propane; the polyglycidyl esters of aliphatic or aromatic polycarboxylic acids such as oxalic acid, succinic acid, glutaric acid, terephthalic acid, 2,6-naphthalene dicarboxylic acid and dimerized linolenic acid; and the polyglycidyl ethers of polyphenols such as bisphenol A, 1,1-bis(4-hydroxyphenyl) ethane, 1,1-bis(hydroxyphenyl)isobutane, 2,2-bis(4-hydroxy-t-butylphenyl)propane, 1,5-dihydroxynaphthalene and novolak resins, with cycloaliphatic polyglycidyl compounds being currently preferred.

The ambient temperature-reactive catalyst systems that may be employed in the preferred adhesive systems are well-known redox couple systems and need not be discussed herein in detail. Basically, such systems comprise at least one oxidizing agent and at least one reducing agent which are co-reactive at room temperature to generate free radicals effective to initiate addition polymerization reactions and cure the adhesive. Substantially, any of the known oxidizing and reducing agents which are so co-reactive can be employed. Representative oxidizing agents include, without limitation, organic peroxides, such as benzoyl peroxide and other diacyl peroxides, hydroperoxides such as cumene hydroperoxide, peresters such as β-butylperoxybenzoate; ketone hydroperoxides such as methyl ethyl ketone, organic salts of transition metals such as cobalt naphthenate, and compounds containing a labile chlorine such as sulfonyl chloride. Representative reducing agents include, without limitation, sulfinic acids; azo compounds such as azoisobutyric acid dinitrile; alpha-aminosulfones such as bis (tolysulfonmethyl)-benzyl amine; tertiary amines such as diisopropyl-p-toluidine, dimethyl aniline and dimethyl-p-toluidine; and aminealdehyde condensation products, for example, the condensation products of aliphatic aldehydes such as butyraldehyde with primary amines such as aniline or butylamine. The use of known accelerators and promoters with the redox couple catalyst systems can be advantageous. Preferably, the oxidizing agent will be present in an amount in the range from about 0.5 to about 50 percent by weight of bonding accelerator, with the amount of reducing agent being in the range from about 0.05 to about 10 preferably about 0.1 to about 6, percent by weight of polymerizable adhesive composition.

In the two package embodiment of the invention the second package can include a bonding activator that includes the oxidizing agent for the redox catalyst system. The bonding activator can include:

(1) from about 0.5 to about 50 percent by weight based on total weight of bonding activator of at least one oxidizing agent which can function as an oxidant of a redox couple catalyst system; and (2) from about 30 to about 99.5 percent by weight, based on total weight of bonding accelerator, of a carrier vehicle. In addition, the bonding accelerator also can contain either the epoxy component or the phosphorus-containing compound.

The carrier vehicles which are suitable for use in the bonding activators can be a simple inert solvent or diluent such as methylene chloride, or butyl benzyl phthalate, including mixtures of such solvents or diluents. The carrier vehicle should contain no more than 5% by weight of any moiety which is reactive with the oxidizing agent at room temperature. The carrier vehicle can be a more complex mixture including at least one film-forming binder in addition to inert solvent or diluent. In this case, the film-forming binder is preferably substantially inert with respect to the oxidant which is present in the accelerator composition. A particularly preferred carrier vehicle comprising at least one film-forming binder is an admixture comprising from about 0.05 to about 50 percent by weight of, (1), at least one saturated organic polymeric film-forming binder having a glass transition temperature in the range from about 0° C. to about 150° C. or, (2), at least one polymer-in-monomer syrup as described herein; and from about 40 to about 99 percent by weight of at least one organic solvent capable of maintaining the film-forming binder, phosphorus-containing compound when incorporated into the bonding activator composition, and oxidizing agent as a stable solution or dispersion. Among the polymeric film-forming binder materials that can be employed in the carrier vehicle are, without limitation, polyalkylacrylates and methacrylates and copolymers thereof, polystyrene and copolymers thereof, vinyl polymers and copolymers, polyesters, polyketones, polysulfones, phenolic resins, polyvinyl butyrals and polycarbonates. The carrier vehicle can contain, in addition to solvent or solvent and film-forming binder, additives such as external plasticizers, flexibilizers, suspenders and stabilizers, providing that any such additives do not unacceptably adversely affect the stability of the activator composition.

The preferred adhesive compositions also can optionally contain up to 60, preferably not more than 30, percent by weight, based on the total weight of components (a)-(e), a third polymeric material having an intrinsic viscosity of 0.1 to 1.3 that can be obtained by the polymerization of at least one acrylic, styrene, substituted acrylic, and non-acrylic olefinic monomers. Exemplary polymeric materials include poly(methyl methacrylate/n-butyacrylate/ethyl acrylate) (90/5/5); poly(n-butyl methacrylate/isobutyl methacrylate) (50/50); poly(n-butyl methacrylate) and poly(ethyl methacrylate). Other optional components include, without limitation, up to 5 percent by weight of an unsaturated dicarboxylic acid ester, up to 20 percent by weight of an unsaturated carboxylic acid having one or more, preferably one, carboxylic acid group, and up to 1 percent by weight of a waxy substance selected from the group consisting of paraffin wax, beeswax, ceresin wax and spermaceti wax, wherein all the weight percents are based on the total weight of components (a)-(e).

Another optional component is 0.01 to 10, preferably 0.5 to 5, percent by weight, based on the total weight of components (a)-(e), of tertiary amines represented by the structure

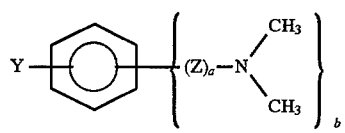

wherein Z is methylene; Y is selected from the group consisting of hydrogen, hydroxy, amino, halogen, alkyl having 1 to 8, preferably 1 to 4, carbon atoms, and alkoxy having 1 to 8, preferably 1 to 4, carbon atoms; a is 0 or 1; and b is 1 or 2.

This tertiary amine is advantageous in accelerating the cure of such compositions containing the unsaturated organophosphorus compounds. Especially preferred tertiary amines are N,N-dimethyl aniline and N,N-dimethylaminomethylphenol.

The environmental resistance of the adhesive systems can be improved by the optional addition of 0.005 to 15, preferably 0.1 to 10, percent by weight, based on the total weight of components (a)-(e), of a mixture of a metal molybdate such as zinc molybdate, calcium molybdate, barium molybdate and/or strontium molybdate and an inert filler such as zinc phosphate, calcium phosphate, magnesium phosphate and/or calcium carbonate. Such mixtures are more fully described in U.S. Pat. No. 4,017,315.

The preferred adhesive systems are provided as multipack adhesive systems where one package contains the polymerizable adhesive composition and a second package contains the bonding activator, with the two packages being mixed at the time of use. It is necessary that the epoxy compound when incorporated into the adhesives of this invention be kept separate from compounds having acidic moieties, such as the phosphorus-containing compound and methacrylic acid to inhibit premature reaction between these components. Thus, in such cases, prior to using the compositions, one package will contain the phosphorus-containing compound and the other package will contain the epoxy component. Preferably, the epoxy component will be incorporated into the bonding activator which contains the oxidizing agent of the redox couple catalyst system, with the phosphorus-containing compound being incorporated into the package containing the polymerizable adhesive composition. While other multipack systems are available, e.g., the bonding activator can contain the reducing agent of the redox couple catalyst system and the epoxy resin with the oxidizing agent and polymerization inhibitors being incorporated into the package containing the polymerizable adhesive mass, they are less preferable with respect to shelf stability. After mixing the individual packages, one or both surfaces to be joined are coated with the mixed adhesive system and the surfaces are placed in contact with each other.

The adhesive systems of the invention may be used to bond metal surfaces, such as steel, aluminum and copper, to a variety of substrates, including metal, plastics, and other polymers, reinforced plastics, fibers, glass, ceramics, wood and the like. It is a feature of the present invention that the herein-described adhesive compositions can be employed to bond metal substrates such as steel, aluminum and copper with little, if any, pretreatment of the metal surface prior to application of the adhesive. Thus, bonding can be effected even to oily metal surfaces which are otherwise clean without an extensive pretreatment as is usually required with the vast majority of currently available primers and adhesives. Additionally, the adhesive systems of this invention provide effective bonding at room temperature, thus heat is not required either for applying the adhesive systems to the substrates or for curing. They can also be employed on porous substrates, unlike the anaerobic adhesives which require the exclusion of air and thus cannot be used on surfaces containing air in their pores.

Polymers A and B can be prepared according to following synthesis scheme:

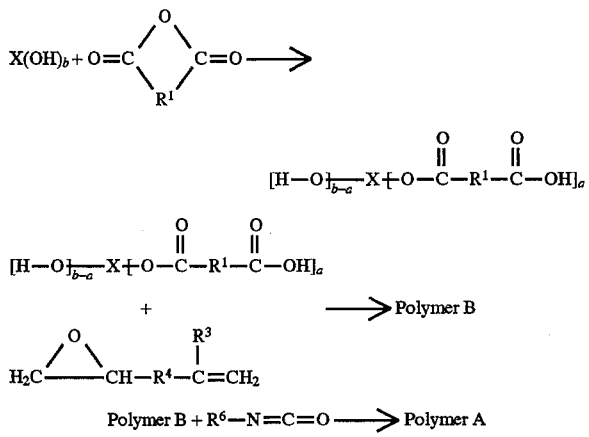

The polyalkadiene that is employed as the polymer backbone precursor in this scheme includes on average at least 1.2, preferably at least 2, hydroxyl terminal or pendant groups per polymer molecule and preferably has the structure $X(OH)_b$, wherein b is at least 1.2, and preferably is 1.2 to 3, more preferably 1.6 to 2.4. A particularly preferred precursor is hydroxyl-terminated polybutadiene. As used herein, "hydroxyl-terminated" means that there is at least one hydroxyl group occupying the terminal position of the polymer chain or the terminal position of a pendant group. Such hydroxyl-terminated polyalkadienes are well-known and hydroxyl-terminated polybutadiene is commercially available, for example, from Elf-Atochem under the tradenames "R45HT" and "R20LM". The number average molecular weight of the hydroxyl-terminated polyalkadiene can range from 1,000 to 9,500, preferably from 1,000 to 5,500.

The hydroxyl-terminated polyalkadiene is converted into a carboxylic acid-terminated polyalkadiene via a ring-opening reaction with the saturated cyclic acid anhydride. As used herein, "carboxylic acid-terminated" means that there is at least one carboxylic acid group occupying the terminal posiiton of the polymer chain or the terminal position of a pendant group. Although not necessarily required, a catalyst may be used to promote this reaction. The catalyst chosen for the anhydride ring-opening reaction is preferred to be simultaneously a catalyst for the subsequent reactions as well. Tertiary amine catalysts are particularly advantageous and include materials such as triethylene diamine, benzyl dimethyl amine, 4-dimethylamino pyridine, and triethyl amine. Other organic bases like alkylated amidines and guanidines are also particularly advantageous. The preferred catalyst is 1,8-diazabicyclo[5.4.0]undec-7-ene. Lewis acids are also effective as catalysts.

It is not necessary to convert all the hydroxyl groups to carboxyl groups in the first step. Conversions of 50 to 100%, preferably 65 to 99% will result in sufficient formation of intermediate that is useful to synthesis polymer B and polymer A. It is preferred that the conversion of hydroxyl groups to carboxyl groups be limited so that the average acid functionality per polymer chain of the carboxylic acid-terminated intermediate is not greater than 2. In general, between 0.5 and 1 mole of saturated cyclic acid anhydride is reacted per mole of hydroxyl-terminated polyalkadiene. Consequently, the reaction product of the hydroxy-terminated polyalkadiene and the saturated cyclic acid anhydride can result in a mixture that includes polymer chains that have a distribution of terminal carboxyl groups, polymer chains that predominantly have two terminal carboxyl groups and/or polymer chains that have one terminal carboxyl groups as well as unreacted hydroxyl-terminated polyalkadiene. Typically, there is no need to separate any of the components of this reaction product mixture in order to perform the subsequent reaction steps.

As described above, the saturated cyclic acid anhydride can be any acid anhydride that does not include any non-aromatic unsaturation in the ring structure that includes the acid anhydride functionality. Examples of such saturated cyclic acid anhydrides include succinic, glutaric, methylsuccinic, 2,2-dimethylsuccinic, cyclohexanedicarboxylic, cis-1,2,3,6-tetrahydrophthalic, cis-5-norbornene-endo-2,3-dicarboxylic, methyl-5-norbornene-2,3-dicarboxylic, exo-3,6-epoxy-1,2,3,6-tetrahydrophthalic diglycolic and the like; aromatic anhydrides such as phthalic, tetrabromophthalic, 3,6-dichlorophthalic, 1,8-naphthalic, diphenic, 4-bromo-1,8-naphthalic, and the like; and alkenyl succinic anhydrides such as butenyl succinic, octenyl succinic, dodecenyl succinic, octadecenyl succinic, and the like.

The carboxylic acid-terminated polyalkadiene is reacted with an olefinic monoepoxide, preferably a compound that includes a terminal epoxy group and a vinylidene group. The molar ratio of olefinic monoepoxide to carboxylic acid functionality of the carboxyl-terminated intermediate can be 80 to 140%, more preferably 95 to 135%. It should be recognized that this olefinic monoepoxide is distinguishable from an epoxy resin because it includes a terminal olefinic or vinylidene group and usually has a molecular weight that is lower than that of an epoxy resin. Olefinic monoepoxide compounds useful in this invention can include 2-methyl-2-vinyl oxirane, 4-vinylphenyl oxirane, 3-vinylphenyl oxirane, 2-vinylphenyl oxirane, vinyl glycidic ester, glycidyl acrylate, glycidyl methacrylate, and the like. Most preferred are glycidyl acrylate and glycidyl methacrylate. The catalyst preferably is a tertiary amine such as is previously described for the anhydride ring-opening reaction.

The secondary nascent hydroxyl groups remaining after the second reaction, as well as any hydroxyls remaining from the original hydroxyl-terminated polyalkadiene, are capped by contacting polymer B with one or more monoisocyanate compounds, with aromatic monoisocyanates being especially preferred. The molar ratio of monoisocyanate compound to polymer B can be 80 to 98%, preferably 90 to 95%, based on the total hydroxyl functionality of polymer B. Representative monoisocyanate compounds include isocyanatoethyl acrylate, isocyanatomethyl methacrylate, isocyanatoethyl methacrylate, phenyl isocyanate, napthyl isocyanate, octadecyl isoocyanate and [benzene, 1-(1-isocyanato-1-methylethyl)-4-(1-methyl ethenyl)], with phenyl isocyanate being preferred.

An advantage of the above described reactive scheme is that the indicated reaction steps can be performed sequentially in situ. In other words, the hydroxyl-terminated polyalkadiene, the saturated cyclic acid anhydride, the olefinic monoepoxide and the monoisocyanate can be introduced sequentially into a single reaction vessel. All the reaction steps may be effected at temperatures of 50° to 120°

15

C., with 75° to 95° C. being preferred for the first reaction step, 100° to 120° C. for the second reaction step and 50° to 65° C. for the third reaction step. Similarly, the reaction steps can be carried out at atmospheric pressure, but a slightly greater than atmospheric pressure such as up to 50 psi could possibly be advantageous.

Preferably, the reaction is carried out under anaerobic conditions using an inert gas atmosphere and in the presence of inhibitors due to the reactivity of the allylic hydrogens to autooxidation. Any known inhibitor may be used such as, but not limited to, benzoquinone, 2,5-dichlorobenzoquinone, di-t-butyl-p-cresol, pyrogallol, nitrobenzene, methylbenzoquinone, 4-methoxyphenol, phenothiazine, and similar materials.

The reaction product mix that includes polymer A or polymer B as well as inconsequential amounts of unreacted reactants or by-products can be used as an additive for an adhesive composition according to this invention. It is not necessary to separate or purify the reaction product mixtures before formulating polymer A or polymer B into an adhesive composition.

EXAMPLE 1

In an inert atmosphere 631 g of a polybutadiene (available from Elf-Atochem under the tradename "R45HT"), having 2.4–2.6 terminal OH groups per molecule (0.54 eq of hydroxyl) and a number average molecular weight of 2800, and 59.9 g (0.40 moles) of phthalic anhydride are reacted in the presence of 0.6 g (0.004 moles) of 1,8-diazabicyclo [5.4.0]undec-7-ene at 85° C. until the acid number drops to 0.58 meq/g. To this mixture is added 76.6 g (0.54 moles) of glycidyl methacrylate, 0.41 g of 4-methoxyphenol, and 0.83 g of methyl-p-benzoquinone. The mixture is reacted at 113° C. until the acid functionality is determined to be less than 0.04 meq/g. The product is designated RM-1 and includes a polymer having a structure as shown above for polymer B. As an option, the product mixture can be diluted to 90% total solids content by adding 77 g of tetrahydrofurfuryl methacrylate to improve storage and ease of transfer and handling. The diluted product mixture is designated RM-2.

EXAMPLE 2

To 686 g of RM-1 is added 61 g (0.51 moles) of phenyl isocyanate. The mixture is reacted at 65° C. for 8–10 hours until the residual isocyanate content is measured at less than 0.05%. To this reaction product mixture is added 83 g of tetrahydrofurfuryl methacrylate. The resulting mixture is designated RM-3 and includes a polymer having a structure as shown above for polymer A.

EXAMPLE 3

In an inert atmosphere blanket 631 g of a polybutadiene (Elf-Atochem "R45HT"), having 2.4–2.6 terminal OH groups per molecule and an number average molecular weight of 2800, and 90.1 g (0.27 moles) of alkenyl succinic anhydride are reacted in the presence of 0.6 g of 1,8-diazabicyclo[5.4.0]undec-7-ene at 85° C. until the acid number drops to 0.37 meq/g. To this mixture is added 38.4 g of glycidyl methacrylate, 0.4 g of 4-methoxyphenol, and 0.8 g of 4-methyl-p-benzoquinone. The mixture is reacted at 113° C. until the acid functionality was determined to be less than 0.04 meq/g. As an option, the reaction product mixture can be diluted to 90% total solids content by adding 85 g of tetrahydrofurfuryl methacrylate. The reaction product mixture includes a polymer having a structure as shown above for polymer B.

EXAMPLE 4

In an inert atmosphere blanket 747,4 g (0.42 moles) of a poly (ethylene/butylene) polymer (a partially-hydrogenated polybutadiene available from Shell Chemical under the tradename "KRATON HPVM-2203") having 1.9 terminal hydroxyl groups per molecule and a hydroxyl equivalent weight of 1800 and 46.1 g (0.31 moles) of phthalic anhydride are reacted in the presence of 0.5 g of 1,8-diazabicyclo [5.4.0]undec-7-ene at 85° C. until the acid number drops to 0.39 meq/g. To this mixture is added 59.0 g (0.42 moles) of glycidyl methacrylate, 0.42 g of 4-methoxyphenol and 0.85 g of 4-methyl-p-benzoquinone. The resulting mixture is reacted at 113° C. until the acid functionality is determined to be less than 0.02 meq/g to produce a polymer having a structure as shown above for polymer B. As an option, the resulting product mixture can be diluted to 90% total solids content by adding 85 g of tetrahydrofurfuryl methacrylate.

EXAMPLE 5

The product mixtures RM-2 and RM-3 were used to prepare adhesive formulations 1 and 2.

| Ingredient (Parts by weight) | 1 | 2 |
| --- | --- | --- |
| RM-2 | 39.56 | — |
| RM-3 | — | 39.56 |
| 2-Methacryloyloxyethyl phosphate | 3.12 | 3.12 |
| Methacrylic acid | 2.22 | 2.22 |
| Di-isopropanol-p-toluidine | 1.00 | 1.00 |
| Calcium metasilicate | 9.33 | 9.33 |
| Dichlorodihydroxybenzoquinone | 0.002 | 0.002 |
| 2,6-di-t-butyl-p-cresol | 0.003 | 0.003 |
| tetrahydrofurfuryl methacrylate | 26.98 | 26.98 |
| 0.1 mm glass spheres | 9.97 | 9.97 |
| Titanium dioxide | 2.66 | 2.66 |
| Silica | 5.15 | 5.15 |

A bonding accelerator is prepared by blending 46 parts by weight of bisphenol A epoxy resin, 10 parts by weight bisphenol A epoxy/carboxylated butadiene-acrylonitrile liquid rubber adduct, 30 parts by weight calcium carbonate, 11 parts by weight benzoyl peroxide at 40% in butyl benzyl phthalate and 3 parts by weight silica.

Formulations 1 and 2 were mixed with the above-described bonding accelerator in a 10:3 ratio by weight and used to bond solvent wiped hot-dipped galvanized steel. The fully mixed adhesives are coated onto one mating surface and a second uncoated mating surface is pressed onto the adhesive to complete the test assemblies. The total glueline thickness is 20 mils for each test assembly. The test assemblies are cured by a cycle of 24 hrs. at ambient room temperature followed by a 30 minute post-bake at 177° C. Lap shear tests were performed on one-half of the assemblies immediately after initial cooldown to room temperature after curing. Lap shear tests were performed on the remaining assemblies after exposure to 500 hours of salt spray testing, wherein the salt spray testing was performed according to ASTM B117-90. The lap shear testing was carried out according to ASTM 1002-94 and involved using two galvanized steel coupons having a thickness of about 60 mils and a surface area of about 1"×3". The coupons were lapped for a distance of 1" and a film of the adhesive composition was applied to each surface. The lap shear test determines the tension (measured in pound per square inch) required to rupture the adhesive bond. The results are shown in the table below.

| Salt Spray Resistance | | |
|---|---|---|
| Adhesive | 1 | 2 |
| Pre exposure lap shear strength/psi | 2742 | 2819 |
| Post exposure lap shear strength/psi | 1375 | 1814 |
| % Strength Retention | 50.1% | 64.3% |

What is claimed is:

1. A composition comprising:

(i) at least one free radical-polymerizable monomer;

(ii) at least one first polymer selected from the group consisting of (a) a polymer A having a representative structure comprising

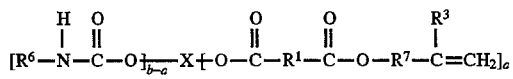

wherein

X is a polyalkadiene residue, a averages from 1.2 to 2.6 per polymer molecule, provided a is ≦b, b is at least 1.2 per polymer molecule, $R^1$ is a divalent radical that includes at least two carbon atoms and is selected from the group consisting of saturated alkylene, substituted saturated alkylene, arylene, and saturated heterocyclic, $R^6$ is phenyl, napthyl, an alkyl group having from 1 to 24 carbon atoms, substituted phenyl, substituted napthyl, phenylalkyl or napthylalkyl, $R^7$ has the structure

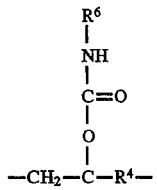

wherein $R^4$ is a divalent radical selected from the group consisting of alkylene, alkylene ester, arylene and alkylene ether, and $R^3$ is hydrogen, an alkyl group of 1 to 4 carbon atoms, —CH=CH$_2$, or —R$^5$—CH=CH$_2$ wherein $R^5$ is an alkylene radical having 1 to 4 carbon atoms; and (b) a polymer B having a representative structure comprising

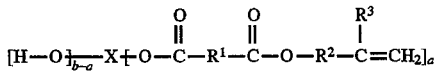

wherein

X is a polyalkadiene residue, a averages 1.2 to 2.6 per polymer molecule, provided a is ≦b, b is at least 1.2, per polymer molecule, $R^1$ is a divalent radical that includes at least two carbon atoms and is selected from the group consisting of saturated alkylene, substituted saturated alkylene, arylene, and saturated heterocyclic, $R^2$ has the structure

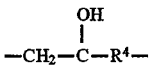

wherein $R^4$ is a divalent radical selected from the group consisting of alkylene, alkylene ester, arylene and alkylene ether, and $R^3$ is hydrogen, an alkyl group of 1 to 4 carbon atoms, —CH=CH$_2$, or —R$^5$—CH=CH$_2$ wherein $R^5$ is an alkylene radical having 1 to 4 carbon atoms;and (iii) optionally, at least one second polymeric material selected from the group consisting of poly(acrylic) ester, poly(methacrylic) ester, poly(urethane), poly(amide), polyester, poly(oxazoline), poly(styrenic), and poly(carbonate).

2. A composition according to claim 1 wherein said composition is an adhesive and said first polymer comprises polymer A, further comprising (iv) 0 to 20 weight percent of a phosphorus-containing compound having one or more olefinic groups and no less than one P—OH group, based on the total weight of components (i)–(v); and (v) an ambient temperature-active catalyst system that includes at least one reducing agent and at least one oxidizing agent that are co-reactive at ambient temperature to generate free radicals that are capable of initiating and propagating cure of said adhesive composition.

3. A composition according to claim 2 wherein said monomer is selected from the group consisting of acrylic acid, substituted acrylic acid, ester of acrylic acid, ester of substituted acrylic acid, styrene, substituted styrene, butadiene, vinylidene chloride and vinyl acetate.

4. A composition according to claim 2 wherein said second polymeric material comprises 0 to 40 weight percent of an olefinic urethane reaction product of an isocyanate-functional prepolymer and a hydroxy-functional monomer having at least one unit of polymerizable unsaturation, such reaction product being characterized by the presence of at least two units of unsaturation and the substantial absence of free isocyanate products, based on the total weight of components (i)–(v).

5. A composition according to claim 2 further comprising (vi) at least one epoxy compound having an average of greater than one 1,2-epoxy groups per molecule.

6. A composition according to claim 1 wherein X comprises a polyalkadiene residue that is derived from at least one of polybutadiene, poly(butadiene-acrylonitrile), poly(butadiene-methacrylonitrile-acrylic acid), partially-hydrogenated polybutadiene or fully-hydrogenated polybutadiene.

7. A composition according to claim 1 wherein X includes at least a 1,4-polybutadiene repeating unit.

8. A composition according to claim 1 wherein $R^1$ is selected from the group consisting of a divalent saturated alkylene having 2 to 4 carbon atoms, a divalent substituted saturated alkylene having 2 to 4 carbon atoms in the alkylene portion and including at least one alkyl, alkenyl, aryl or alkylaryl substituent bonded to at least one of the carbon atoms of the alkylene portion, and a divalent unsubstituted or substituted arylene wherein the divalent bond sites are located on the aromatic ring.

9. A composition according to claim 1 wherein $R^4$ is —$CH_2$—O—C(O)—.

10. A composition according to claim 1 wherein $R^3$ is an alkyl group having 1 to 4 carbon atoms.

11. A composition according to claim 1 wherein $R^6$ is phenyl or phenylalkyl.

12. An adhesive system comprising a first and second package, said packages being mixable at the time of use to provide a curable adhesive, wherein said first package comprises (i) 10 to 90 weight percent of at least one olefinic monomer selected from the group consisting of acrylic acid, substituted acrylic acid, ester of acrylic acid, ester of substituted acrylic acid, styrene, substituted styrene, butadiene, vinylidene chloride and vinyl acetate;

(ii) 10 to 80 weight percent of at least one first polymer selected from the group consisting of (a) a polymer A having a representative structure comprising

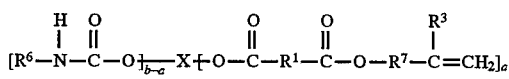

wherein
X is a polyalkadiene residue,
a averages from 1.2 to 2.6 per polymer molecule, provided a is $\leq$ b,
b is at least 1.2 per polymer molecule,
$R^1$ is a divalent radical that includes at least two carbon atoms and is selected from the group consisting of saturated alkylene, substituted saturated alkylene, arylene, and saturated heterocyclic,
$R^6$ is phenyl, napthyl, an alkyl group having from 1 to 24 carbon atoms, substituted phenyl, substituted napthyl, phenylalkyl or napthylalkyl,
$R^7$ has the structure

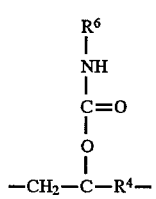

wherein
$R^4$ is a divalent radical selected from the group consisting of alkylene, alkylene ester, arylene and alkylene ether, and
$R^3$ is hydrogen, an alkyl group of 1 to 4 carbon atoms, —CH=$CH_2$, or —$R^5$—CH=$CH_2$ wherein $R^5$ is an alkylene radical having 1 to 4 carbon atoms; and (b) a polymer B having a representative structure comprising

wherein
X is a polyalkadiene residue,
a averages 1.2 to 2.6 per polymer molecule, provided a is $\leq$ b,
b is at least 1.2, per polymer molecule, $R^1$ is a divalent radical that includes at least two carbon atoms and is selected from the group consisting of saturated alkylene, substituted saturated alkylene, arylene, and saturated heterocyclic, $R^2$ has the structure

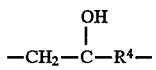

wherein
$R^4$ is a divalent radical selected from the group consisting of alkylene, alkylene ester, arylene and alkylene ether, and
$R^3$ is hydrogen, an alkyl group of 1 to 4 carbon atoms, —CH=$CH_2$, or —$R^5$—CH=$CH_2$ wherein $R^5$ is an alkylene radical having 1 to 4 carbon atoms;

(iii) optionally, at least one second polymeric material selected from the group consisting of poly(acrylic) ester, poly(methacrylic) ester, poly(urethane), poly(amide), polyester, poly(oxazoline), poly(styrenic), and poly(carbonate); and (iv) 0.05 to 10 weight percent of at least one reducing agent, based on the total weight of the first package, and wherein the second package comprises a bonding activator that includes an oxidizing agent that is reactive at ambient temperature with said reducing agent when said first and second packages are mixed together to produce free radicals that are capable of initiating and propagating cure of said adhesive system.

13. An adhesive system according to claim 12, wherein said first package further comprises (v) a phosphorus-containing compound having one or more olefinic groups and no less than one P—OH group.

14. An adhesive system according to claim 12, wherein said second polymeric material comprises an olefinic urethane reaction product of an isocyanate-functional prepolymer and a hydroxy-functional monomer having at least one unit of polymerizable unsaturation, such reaction product being characterized by the presence of at least two units of unsaturation and the substantial absence of free isocyanate products.

15. An adhesive according to claim 1 wherein said composition is a matrix composition for fiber-reinforced composite, said monomer comprises a styrenic monomer and said second polymeric material comprises an unsaturated polyester.

16. A composition according to claim 12 wherein $R^1$ is selected from the group consisting of a divalent saturated alkylene having 2 to 4 carbon atoms, a divalent substituted saturated alkylene having 2 to 4 carbon atoms in the alkylene portion and including at least one alkyl, alkenyl, aryl or alkylaryl substituent bonded to at least one of the carbon atoms of the alkylene portion, and a divalent unsubstituted or substituted arylene wherein the divalent bond sites are located on the aromatic ring.

17. A composition according to claim 1 wherein said first polymer comprises polymer A.

18. An adhesive according to claim 12 wherein said first polymer comprises polymer A.

19. A composition according to claim 1 further comprising an ambient temperature-active catalyst system that includes at least one reducing agent and at least one oxidizing agent that are co-reactive at ambient temperature to generate free radicals that are capable of initiating and propagating cure of said composition.

20. A composition according to claim 19 wherein said reducing agent is selected from the group consisting of a sulfinic acid, an azo compound, an alpha-aminosulfone, a tertiary amine, and an aminealdehyde condensation product and said oxidizing agent is selected from the group consisting of a peroxide, a perester, an organic salt of a transition metal and a compound containing a labile chloride.

21. An adhesive according to claim 12 wherein said reducing agent is selected from the group consisting of a sulfinic acid, an azo compound, an alpha-aminosulfone, a tertiary amine, and an aminealdehyde condensation product and said oxidizing agent is selected from the group consisting of a peroxide, a perester, an organic salt of a transition metal and a compound containing a labile chloride.

22. An adhesive according to claim 18 wherein said first package further comprises (v) a phosphorus-containing compound having one or more olefinic groups and no less than one P—OH group.

* * * * *